United States Patent [19]

Hatwar et al.

[11] Patent Number: 5,612,108
[45] Date of Patent: Mar. 18, 1997

[54] MAGNETO-OPTICAL STRUCTURE HAVING TITANIUM UNDERLAYER

[75] Inventors: Tukaram K. Hatwar, Penfield; Douglas G. Stinson, Fairport; Robert H. Webster, Hilton, all of N.Y.

[73] Assignee: Eastman Kodak Company, Rochester, N.Y.

[21] Appl. No.: 602,400

[22] Filed: Feb. 16, 1996

[51] Int. Cl.⁶ ........................................ B32B 3/00
[52] U.S. Cl. ................ 428/64.1; 428/64.2; 428/64.3; 428/64.4; 428/694 ML; 428/694 SC; 428/694 MT; 428/694 RE; 428/694 ST; 428/900; 428/913
[58] Field of Search ................. 428/64.1, 64.2, 428/64.3, 64.4, 64.7, 457, 688, 689, 694 ML, 694 SC, 694 MT, 694 RE, 694 ST, 900, 913

[56] References Cited

U.S. PATENT DOCUMENTS

| | | | |
|---|---|---|---|
| 4,569,881 | 2/1986 | Freese et al. | 428/213 |
| 4,748,073 | 5/1988 | Sagoi et al. | 428/213 |
| 4,865,916 | 9/1989 | Yamauara et al. | 428/336 |
| 4,877,690 | 10/1989 | Glocker et al. | 428/627 |
| 4,883,711 | 11/1989 | Shiroishi et al. | 428/336 |
| 5,055,359 | 10/1991 | Tsuno et al. | 428/448 |
| 5,084,319 | 1/1992 | Hibst et al. | 428/64 |

*Primary Examiner*—Patrick Ryan
*Assistant Examiner*—Elizabeth Evans
*Attorney, Agent, or Firm*—Raymond L. Owens

[57] ABSTRACT

An optical recording medium including a substrate, a metal underlayer deposited over the substrate wherein the underlayer has a substantially low thermal conductivity, a recording layer over the metal underlayer, and a transparent protective layer over the recording layer.

7 Claims, 7 Drawing Sheets

MAGNETO-OPTICAL STRUCTURE HAVING TITANIUM UNDERLAYER

FIELD OF INVENTION

This invention relates to the magneto-optical (MO) disk with decreased noise, and increased carrier to noise ratio. More particularly, it relates to a magneto-optical recording element having improved performance, greater reliability and corrosion stability.

BACKGROUND OF THE INVENTION

In magneto-optical recording medium frequently embodied in a disk, information in the form of magnetic domains is written on the recording layer having perpendicular anisotropy. This information is read by irradiating the medium with a linearly polarized laser beam and detecting the change of the incident laser beam caused by the interaction of the light with the magnetization. Kerr rotation, coercivity, sensitivity and carrier to noise ratio are critical parameters to be considered for achieving high performance magneto-optical medium.

Currently rare earth-transition metal alloy layers are used as the recording medium. An inherent disadvantage of such layers is that they are highly susceptible to corrosion and oxidation resistance.

When such a layer is deposited directly on the substrate made of organic material such polycarbonate (PC) and polymethylmethacrylate (PMMA), the MO layer does not possess a square Kerr hysteresis loop which is essential for obtaining high performance. For this purpose, the MO recording layer is sandwiched between two layers of ceramics such as, for example, AlN and SiN. These dielectric layers also enhance their environmental stability. However, these dielectric layers are difficult to deposit in a reliable fashion. The reactive sputtering process which is generally used to deposit the dielectric layers may also damage the sensitive substrate and generate mechanical stresses which also may cause the failure of the disk structure. Protective overcoats of active metals such Ti and Cr have been utilized earlier to protect the recording medium eliminating the top overcoat of dielectric (commonly assigned U.S. Pat. No. 4,877,690 to D. Glocker, T. K. Hatwar, S. T. Rao, G. L. McEntyre, and D. G. Stinson). For such a disk the recording and reading was done through the substrate. For front surface recording the metal overcoats can not be used because of their high absorption coefficient.

SUMMARY OF THE INVENTION

An object of the present invention is to provide an improved optical recording medium.

Another object is to provide a magneto-optical structure with a low noise level and high writing sensitivity.

These objects are achieved with an optical recording medium comprising:

a) a substrate;

b) a metal underlayer deposited over the substrate wherein the underlayer has a substantially low thermal conductivity;

c) a recording layer over the metal underlayer; and d) a transparent protective layer over the recording layer.

Quite unexpectedly it was found that the squareness and the coercivity of the MO layer were significantly improved by using a thin layer of Ti metal underlayer over a surface smoothed aluminum substrate. Such improvement in the squareness of the Kerr hysteresis loop reduces the medium recording noise.

Also because of its low thermal conductivity, Ti metal layer acts as a thermal barrier between the MO layer and the surface smoothed aluminum substrate, thus improving the writing sensitivity of the medium.

ADVANTAGES

The use of titanium metal underlayer layer improves the squareness and the coercivity of the Kerr hysteresis loop of the subsequently deposited rare earth-transition metal alloy recording layer.

The resulting MO medium has reduced noise level and thus increased carrier to noise ratio.

The resulting MO medium has higher writing sensitivity because Ti metal layer has significantly low thermal conductivity.

Ti underlayer also provides protection to the MO medium and the resulting medium has high environmental stability.

Ti metal is easier to deposit by d.c. sputtering as compared to dielectric materials, thus increasing the manufacturing throughput.

Ti metal is self-passivating and provides corrosion and oxidation protection to the recording layer.

The use of an aluminum substrate provides a rigid platform for multilayer recording structures.

BRIEF DESCRIPTION OF THE DRAWINGS

FIG. 4A without an underlayer; FIG. 4B with a Ti metal underlayer; and FIG. 4C with an aluminum metal underlayer;

DETAILED DESCRIPTION OF THE INVENTION

Figure 1:
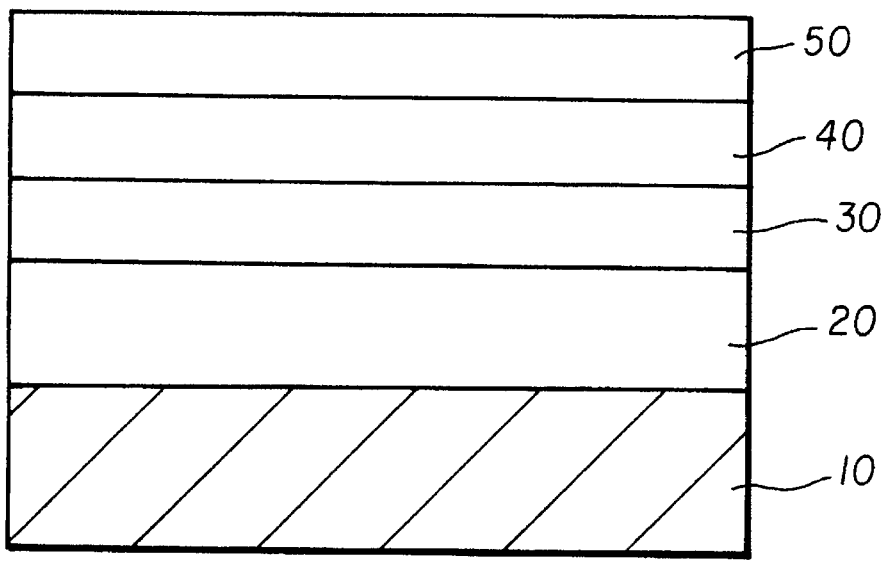
FIG. 1 is a schematic of a recording medium in accordance with the present invention.

FIG. 1 shows a schematic of a portion of an optical recording medium in accordance with the present invention. Typically the present invention will be embodied in an optical recording disk. In FIG. 1 there is provided a substrate 10 which is made substantially of aluminum, a surface smoothing layer 20 over the substrate, a metal underlayer 30 on the smoothing layer 20, and an optical recording layer 40 on the metal underlayer layer 30. As will be discussed later, the metal underlayer is preferably made of Ti. An antireflection layer 50 of transparent dielectric made of aluminum nitride (AlN) is used to enhance the Kerr rotation as well as for protecting the MO layer.

Figure 2:
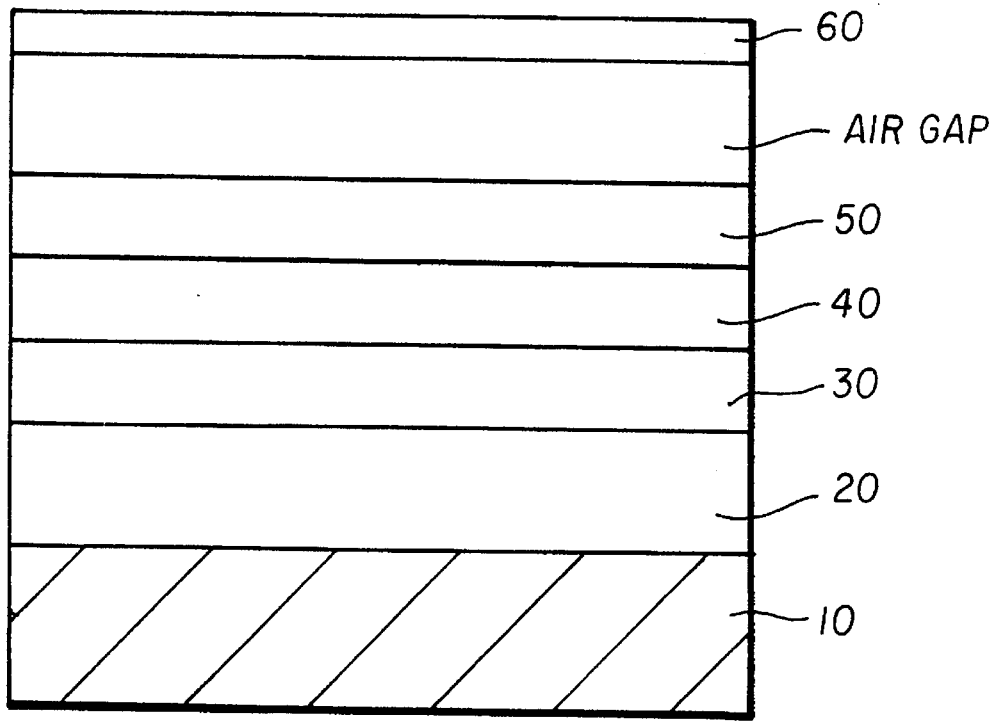
FIG. 2 is another schematic of optical recording medium similar to FIG. 1 except with an additional protective transparent cover sheet.

FIG. 2 shows a structure similar to FIG. 1 and where the layers correspond, the same numbers will be used. It will be understood to those skilled in the art that the present invention can be embodied in an optical disk which has an interior spacer ring in a central opening and another outer spacer ring on the periphery of the disk. Stretched over these spacer rings, as shown in FIG. 2, a thin transparent and low birefringence cover sheet 60, preferably made of polycarbonate, is used to protect the MO medium from dust and handling.

Figure 3:
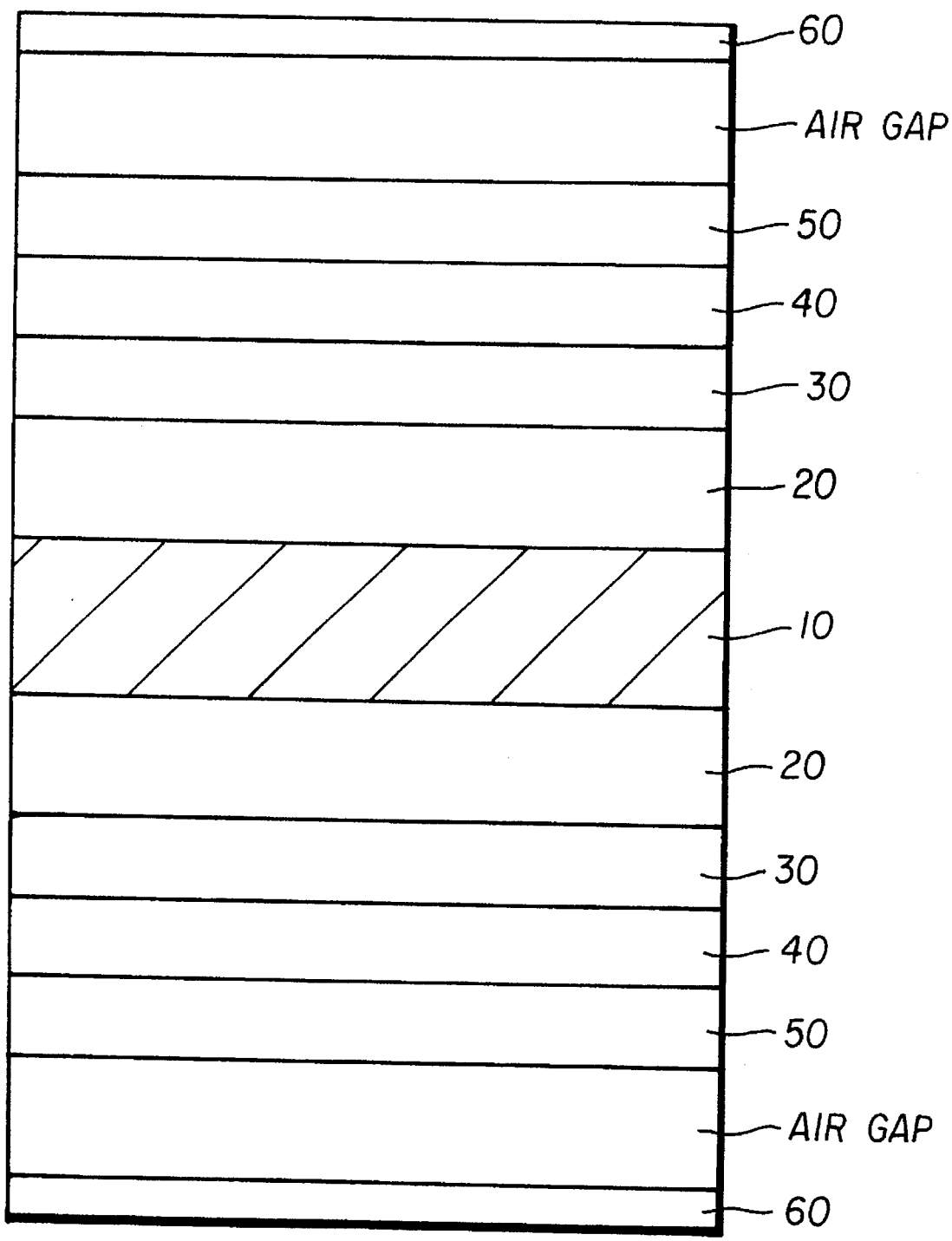
FIG. 3 is a schematic of a two-sided multilayer recording structure in accordance with the present invention.

FIG. 3 shows the schematic of the two-sided disk structure wherein separate recording structures are formed on each side of the aluminum substrate 10. These structures are the same as shown in FIG. 2 and so the layers carry the same numbers.

With this type of structure, incident laser light passes through the transparent cover sheet 60 and the dielectric overcoat 50 and interacts with the recording layer 40 changing the Kerr rotation. As is well known, during readout, the Kerr rotation can be monitored to indicate whether a bit has been recorded. The recording layer can be either TbFeCo or TbFeCoZrPd.

In accordance with the present invention, TbFeCo based MO layers were prepared by d.c. sputtering a homogenous alloy target having nominal composition $Tb_{22}FeCo_5Zr_4Pd_4$ in an Ar atmosphere. The sputtering pressure and deposition rate were 3 mT Ar and 0.2 nm/second, respectively. Ti and Al layers were prepared by d.c. sputtering Ti and Al metal targets. The base pressure before depositing the structure was about $1\times10^{-6}$ Torr.

Several test samples were prepared by depositing the MO layers without and with underlayers. The perpendicular Kerr hysteresis loops were measured at 780 nm wavelength to obtain coercivity (Hc) and the Kerr rotation ($\theta k$) of the structures. The dynamic measurements of the magneto-optic structures were made under the following conditions: 6.03 m/sec disk velocity; 3.87 MHz carrier frequency; 90 ns write laser pulse; 30 kHz bandwidth; 300 Oe bias field; 0–10 mW write power; and 1.5–2.0 mW read power.

Figure 4A:
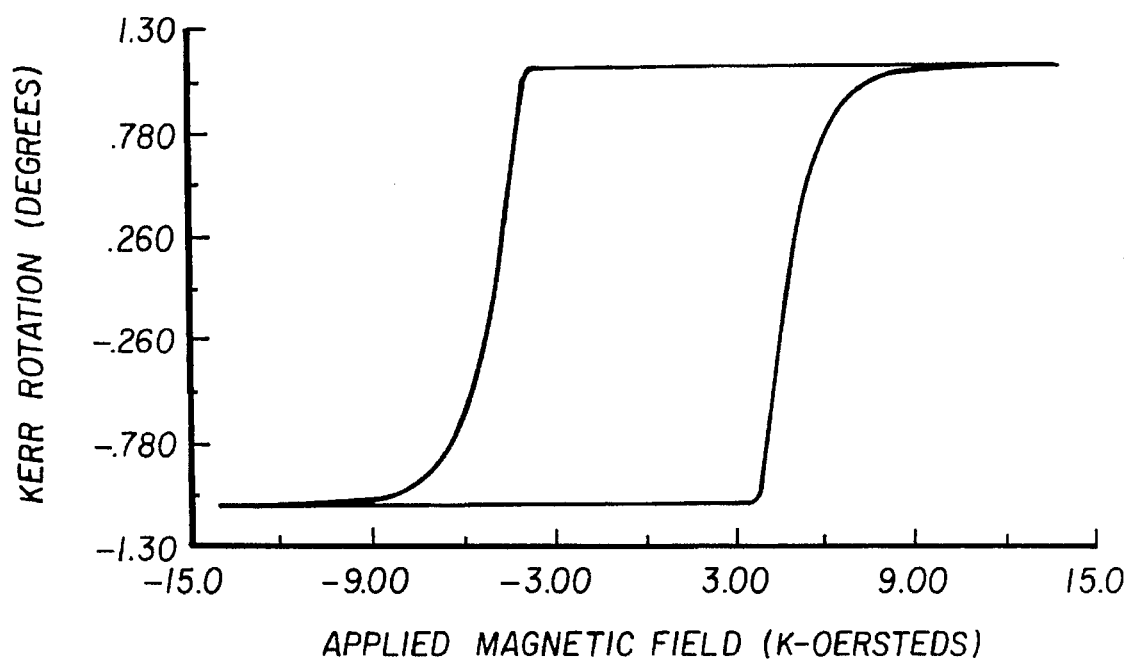
FIG. 4A, FIG. 4B, and FIG. 4C show the Kerr hysteresis loop of the MO layers deposited on the surface smoothed aluminum substrate.
Figure 4B:
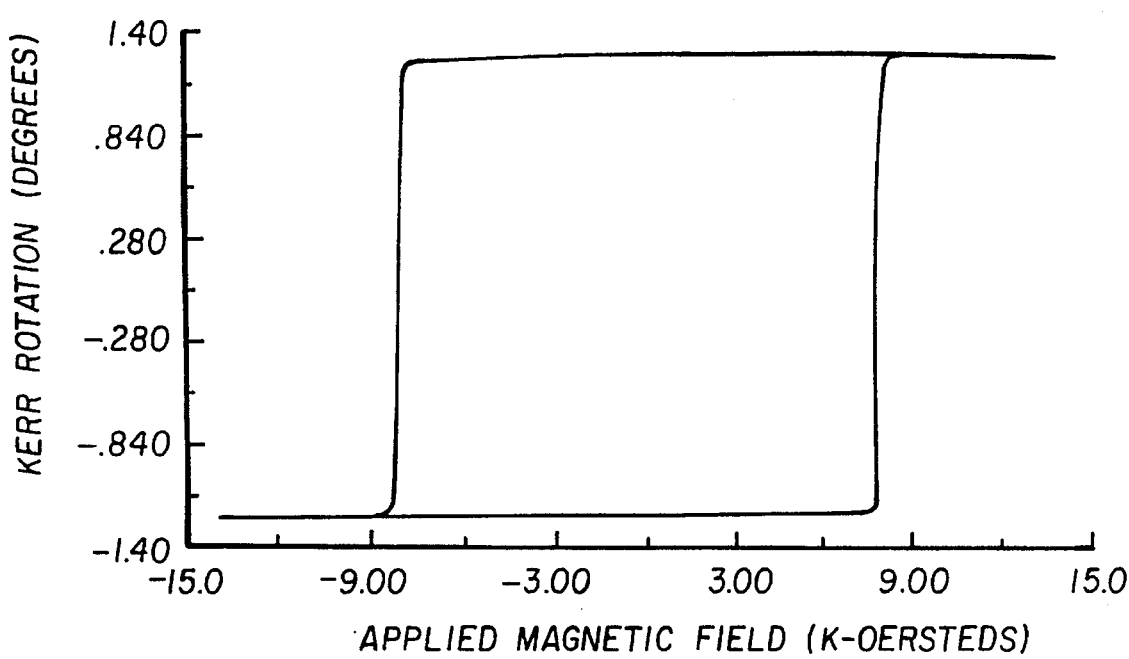
Figure 4C:
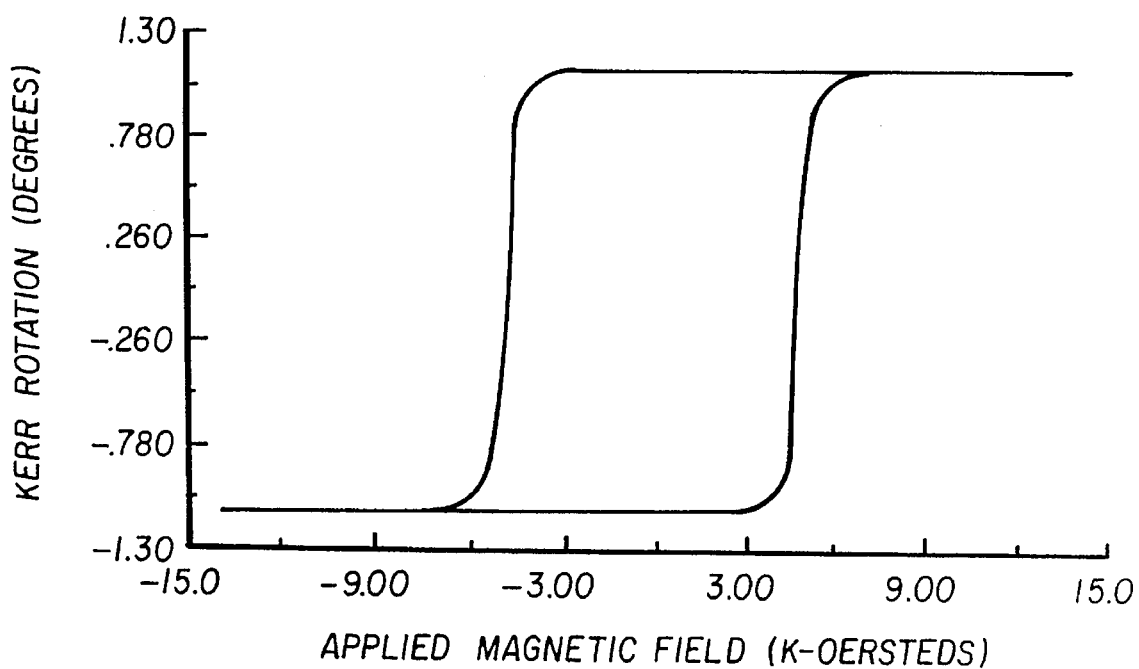

FIG. 4A, FIG. 4B, and FIG. 4C show the Kerr hysteresis loops of the MO layer deposited on the surface smoothed aluminum substrate: a) without an underlayer, b) with a 60 nm thick Ti underlayer, and c) with a 60 nm aluminum metal underlayer, respectively. The Kerr loop of the MO layer when deposited directly on the surface smoothed aluminum substrate (FIG. 4A) is slanted, and posses low coercivity. Whereas when the same MO layer is deposited on the Ti metal underlayer, both the squareness and the coercivity of the Kerr loop have significantly improved (FIG. 4B). This enhancement in the MO properties improves the recording characteristics of the disk structure. In contrast, if aluminum metal is used as an underlayer, there was no improvement in the Kerr hysteresis loop of the MO layer (FIG. 4C).

Several full structure disks were prepared using various thicknesses of the underlayer layer and their dynamic performance was measured for carrier, noise, and carrier to noise ratio. It was found that significantly lower noise and higher CNR were obtained where the underlayer was Ti. Whereas the noise level was high and CNR was low when the underlayer was aluminum metal.

Figure 5A:
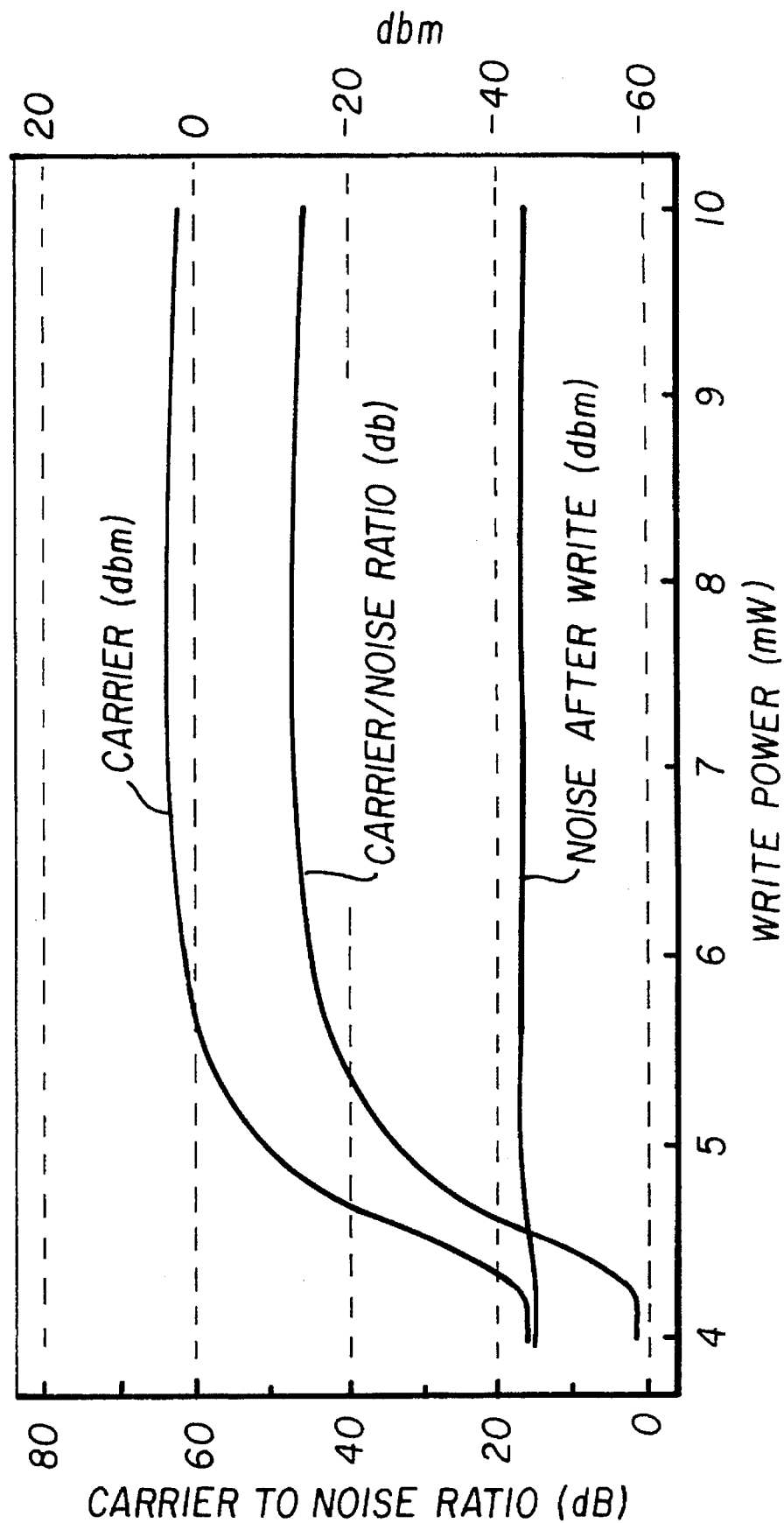
FIG. 5A and FIG. 5B show the dynamic performance of the two disk using Ti and aluminum metal underlayers, respectively.
Figure 5B:
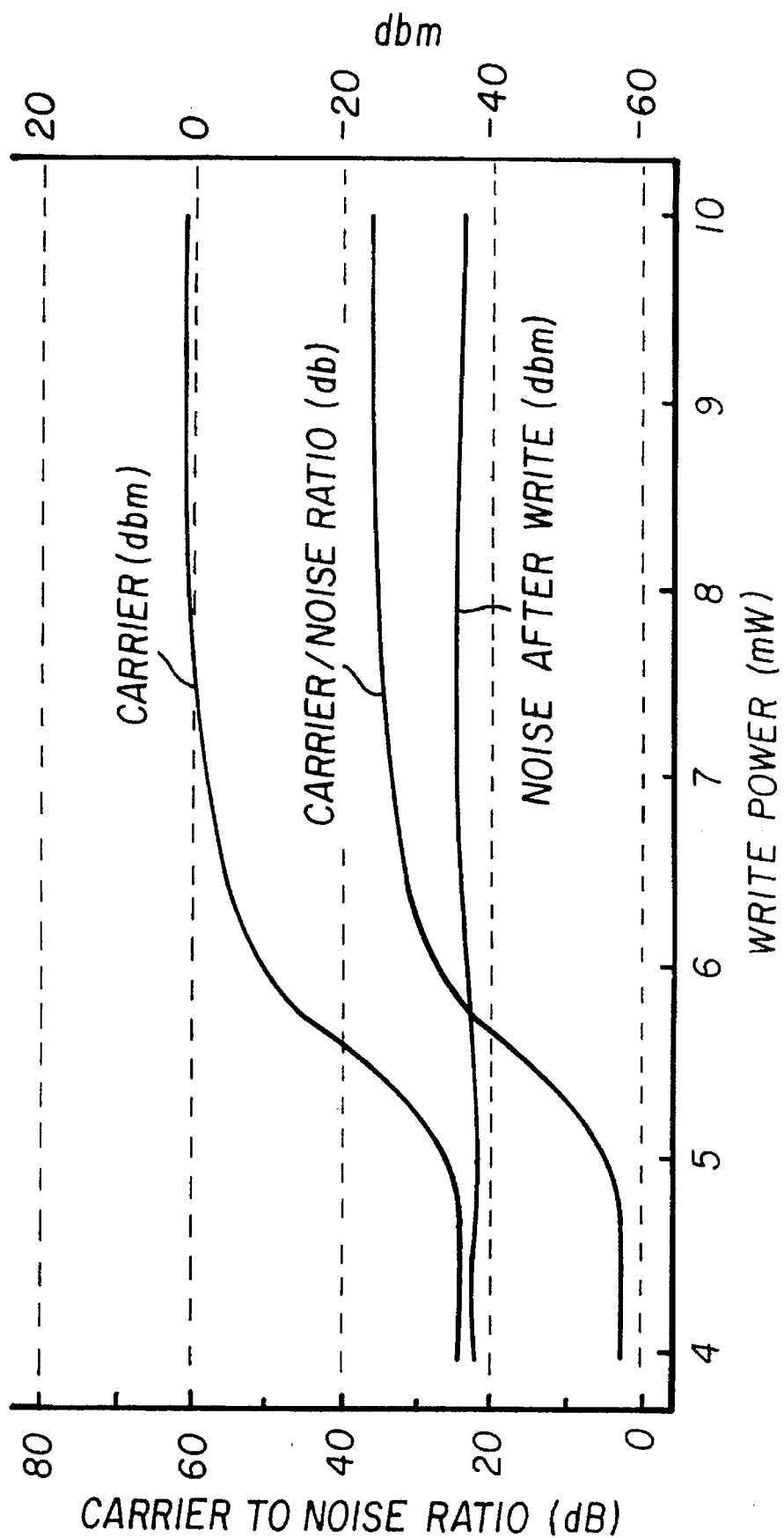

FIG. 5A and FIG. 5B show the comparison of the noise level, carrier and carrier to noise ratio as a function of write power for the two disks, Ti and 60 nm aluminum metals, respectively. The overall noise level has improved by 3–4 dB when the Ti metal was used as an underlayer. The carrier to noise ratio is also much higher for this disk. Furthermore the writing threshold power is lower in the disk with the Ti underlayer than the disk using aluminum indicating it has higher writing sensitivity.

Figure 6:
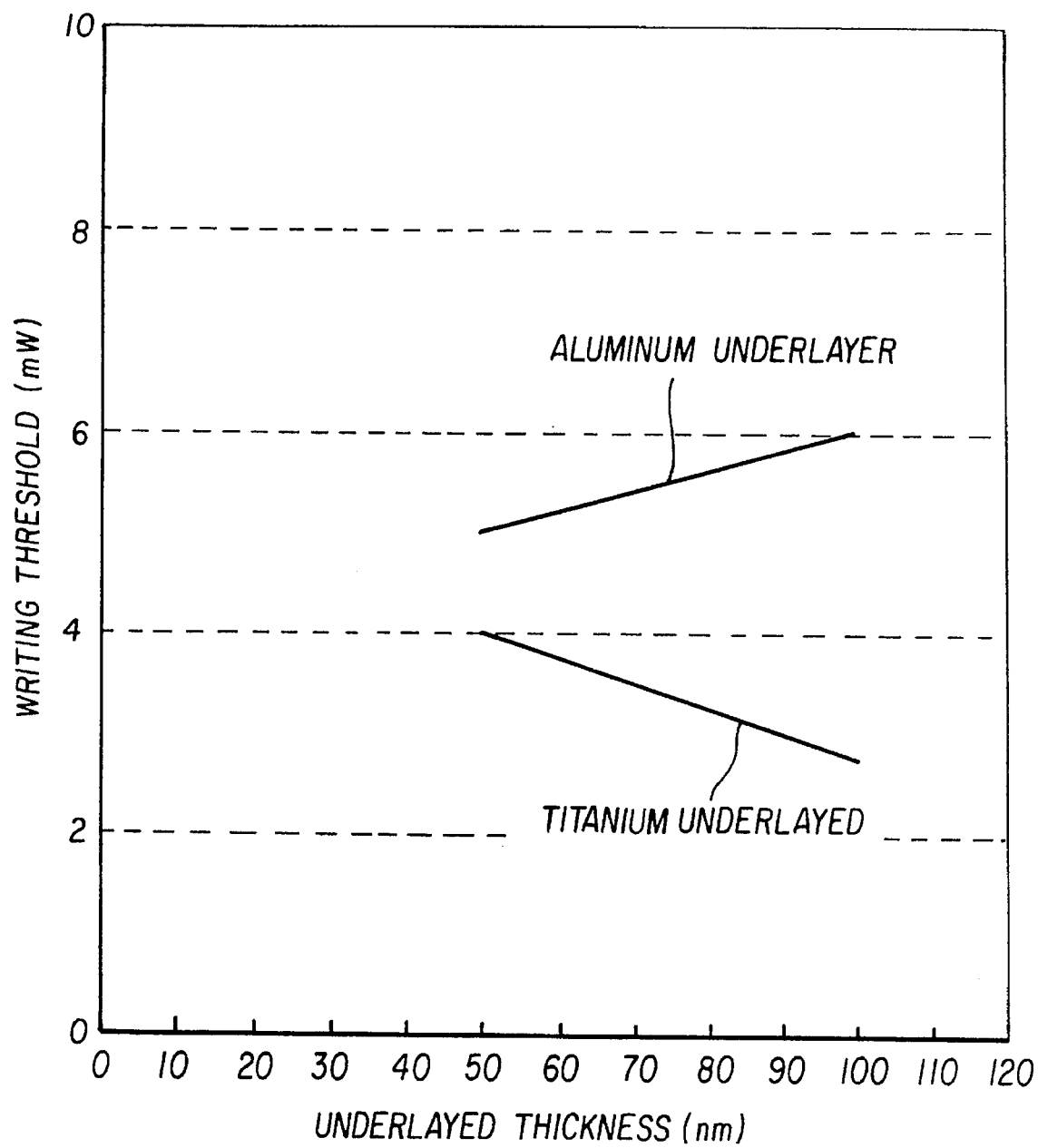
FIG. 6 is a graph depicting writing sensitivity as a function of Ti and Al metal layer thickness.

FIG. 6 shows the writing as a function of Ti and aluminum underlayer thickness. It is interesting to note that the writing threshold decreases monotonically with increasing Ti layer thickness. Whereas the writing threshold increases when underlayer is aluminum.

This improvement in the writing sensitivity is believed to be due to the very low thermal conductivity of the Ti metal. It has significantly lower thermal conductivity as compared to the other metals and dielectrics. For example, the thermal conductivity values measured from 150 nm thin layer of Ti, aluminum and AlN were 8 W/Km, 190 W/Km, and 15 W/Km, respectively ((D. Raasch and S. Klahn, J. Mag. Mag. Mat. 93, (1991), 365)). By low thermal conductivity is meant a thermal conductivity of less than 15 W/Km for a thin layer of about 150 nm thick. Ti metal acts as a thermal barrier between the MO layer and the surface smoothed aluminum substrate, thus improving the writing sensitivity of the medium.

In the above examples, results were described using TbFeCo as a MO layer and Ti and Al layers as underlayers. Other optical recording layers as well as other underlayers of Ti metal alloys such as Ti—Al, Ti—Cr could also be used. Moreover, although aluminum is preferable, other substrate materials such as PC and PMMA can be used. It will be understood to those skilled in the art that the term MO layer includes structures which have a number of multilayers such as cobalt/platinum multilayers (see, for example, commonly assigned U.S. Pat. No. 5,436,072 to T. K. Hatwar and Y. S. Tyan).

The invention has been described in detail with particular reference to certain preferred embodiments thereof, but it will be understood that variations and modifications can be effected within the spirit and scope of the invention.

| PARTS LIST | |
|---|---|
| 10 | substrate |
| 20 | smoothing layer |
| 30 | metal underlayer |
| 40 | optical recording layer |
| 50 | antireflection layer |
| 60 | low birefringence cover sheet |

We claim:

1. An optical recording structure, comprising:

a) a substrate made substantially from aluminum; and b) separate multilayer recording structures formed on each surface of the substrate, each such multilayer structure including:

i) a surface smoothing layer on the substrate;

ii) a metal underlayer deposited on the surface smoothing layer wherein the underlayer includes Ti metal, Ti—Al and Ti—Cr alloys;

iii) a recording layer over the metal underlayer; and iv) a transparent protective layer over the recording layer.

2. The optical recording structure of claim 1 wherein each recording layer includes a magneto-optical material.

3. The optical recording structure of claim 1 wherein each recording layer is a rare earth-transition metal based amorphous alloy.

4. The optical recording structure of claim 1 wherein each recording layer is is selected from the group consisting of TbFeCo and TbFeCoZrPd alloy.

5. The optical recording structure of claim 1 wherein each underlayer layer has a thickness of 10–120 nm and is selected to improve the noise level and performance of the optical disk.

6. The optical recording structure of claim 1 wherein each protective overcoat includes aluminum-nitride, and silicon nitride.

7. The optical recording structure of claim 1 further includes a transparent and low birefringence protective cover sheet for each multilayer structure.

* * * * *